(No Model.)

C. G. BUECHNER.
PLOW.

No. 404,823. Patented June 11, 1889.

Witnesses
E. M. Nottingham
V. E. Hodges

Inventor
C. G. Buechner
By his Attorney
H. A. Lyman

UNITED STATES PATENT OFFICE.

CARL GUSTAV BUECHNER, OF WEBSTER, DAKOTA TERRITORY.

PLOW.

SPECIFICATION forming part of Letters Patent No. 404,823, dated June 11, 1889.

Application filed November 30, 1888. Serial No. 292,283. (No model.)

*To all whom it may concern:*

Be it known that I, CARL GUSTAV BUECHNER, of Webster, in the county of Day and Territory of Dakota, have invented certain new and useful Improvements in Plows; and I do hereby declare the following to be a full, clear, and exact description of the invention, such as will enable others skilled in the art to which it appertains to make and use the same.

My invention relates to an improvement in wheel-plows, and has for its object to provide an ordinary walking-plow with an attachment whereby the operator will be provided with a seat that may be used at will.

A further object is to furnish an ordinary plow of improved construction with a supplemental beam, a stub-axle, a wheel, and a seat mounted on the axle and beam, and hinge these parts upon the beam and handles of the plow, so that they may be quickly attached or removed from connection with the plow.

A further object is to combine an adjustable attachment, consisting of a supplemental beam, a stub-axle, a ground-wheel, and a seat, with an ordinary plow, so that the mold-board and landside of the plow may be given any desired degree of inclination to suit the ground operated upon.

With these objects in view my invention consists in certain features of construction and combinations of parts, that will be more fully described, and pointed out in the claims.

Figure 1:
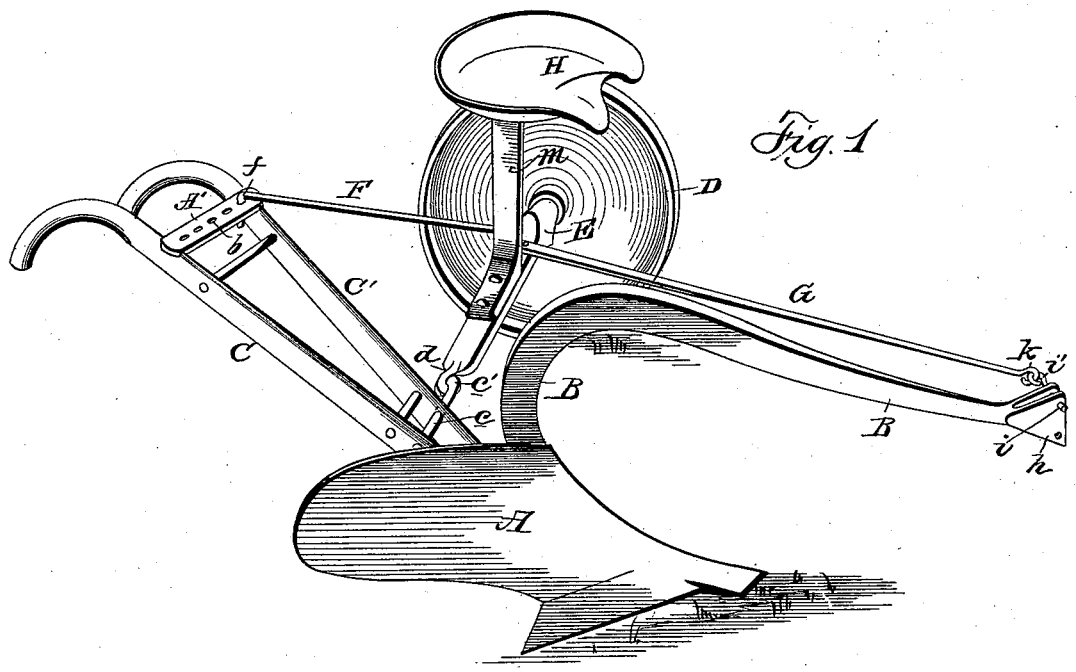
Figure 2:
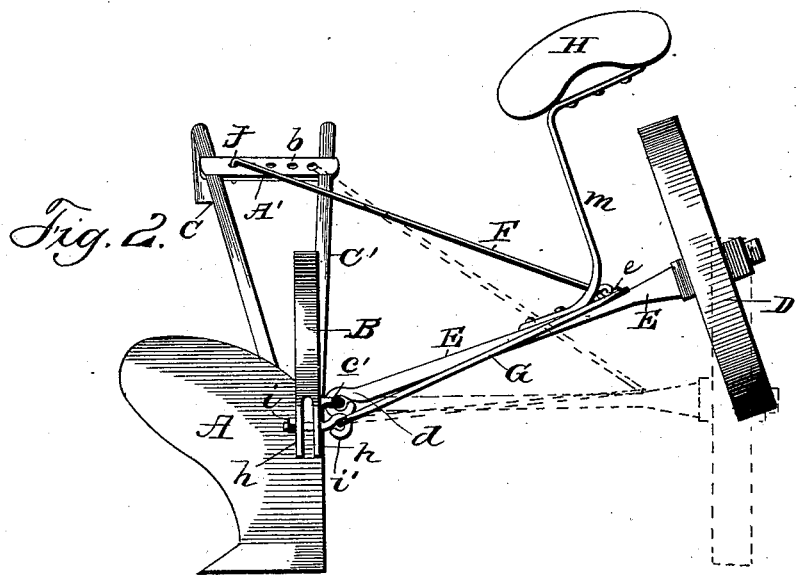

Referring to the drawings, Figure 1 represents a front perspective view of the plow, and Fig. 2 is a view of the plow when adjusted for side-hill work.

A is the mold-board, B the beam and standard, and C C' the handles of the plow proper, which may be constructed after any well-approved pattern that may be preferred. Across the top portion of the handle C a flat bar A' is secured, which latter has a series of perforations $b$ made in its body at spaced intervals.

On the lower portion of the plow-handles a second transverse bar $c$ is fixed, which is provided with an eye $c'$, that is formed on its end which is adjacent to the handle C', that lines with the beam B or landside A' of the plow.

The land-wheel D is mounted to revolve on a spindle formed on the outer end of the stub-axle E, the inner end of the axle being provided with a hook $d$, that is inserted in the eye $c'$, and it is essential that the land-wheel should be of such relative diameter to the height of this point of connection of the axle with the plow that the wheel will operate in a vertical plane and the axle lie horizontally when the plow is used on comparatively level ground.

On the rear side of the axle E a loop $e$ is affixed near to the hub of the land-wheel D, and a connecting-rod F is loosely attached to this loop or eye, said rod extending diagonally upward toward the bar A', and provided at its upper end with a hook $f$, to engage any one of the spaced perforations made in this bar.

It will be noticed in Fig. 1 that the hook $f$ is inserted through the hole in the bar A' which is nearest the handle C' when the land-side of the plow is about in a vertical plane with regard to the ground operated on and the land-wheel also.

On the front end of the beam B there are two vertical and parallel jaws $h$, perforated at spaced intervals, each pair of holes in the jaws aligning with each other to adapt them to receive a draft-pin $i$, which may be inserted and secured in any pair of the holes, this provision being made to afford means for the change of draft of the plow to increase or decrease the depth of furrow cut. The draft-pin $i$ has a ring or eye $i'$ formed on one end. The eye is engaged by the hooked end $k$ of the supplementary beam G, which beam extends rearwardly and is secured to the axle-body at a point near to the wheel D, the means of attachment of the supplementary beam G to the axle E being such as to allow the beam to be adjusted laterally to permit its ready connection with the main plow-beam B, as has been explained.

Upon the axle E, between the supplementary beam G and the point of hooked connection of the axle with the plow-handle C', a bracket-arm $m$ is attached, which is upwardly projected to give support to the seat H, which is thus held inside the track of the land-wheel D, so that the weight of the driver will be thrown between the wheel and plow, causing the latter to retain its proper position with regard to the soil when in motion, holding the tread of the plow correctly seated to cause the furrow to be fairly turned and the plow to operate equally as well when the seat is occupied as when the driver is walking and controlling the plow with its handles C C'.

When the plow is used upon a side-hill the hooked adjustment of the connecting-rod F is changed and its hook $f$ inserted in a hole nearer the handle C, which will throw the wheel D out of a perpendicular plane and adapt the plow to cut properly on the inclined surface of a hillside while the land-wheel runs on the sloping ground surface above the plow.

If it is desired, the wheel, axle, and beam may be quickly disconnected from the plow, and the latter be used in the ordinary way, as the manner of attaching these parts to the plow affords proper facilities for their rapid attachment or disconnection, as has been clearly shown.

Having fully described my invention, what I claim as new, and desire to secure by Letters Patent, is—

1. The combination, with a plow, a hinged stub-axle, a seat mounted on the axle, and a land-wheel, of a supplementary beam loosely secured to the axle and the main beam of the plow, and a device to adjustably secure the axle to the handles of the plow, substantially as set forth.

2. The combination, with a plow-beam, a mold-board, landside, and plow-handles, of a stub-axle hinged to one of the handles, a seat mounted on the stub-axle, a supplementary plow-beam removably attached to the front end of the main plow-beam and also pivoted on the stub-axle, and a connecting-rod that is loosely secured to the axle and adjustably attached to a bar which is fastened to the plow-handles, substantially as set forth.

In testimony whereof I have signed this specification in the presence of two subscribing witnesses.

CARL GUSTAV BUECHNER.

Witnesses:
JOHN F. BLOKE,
WILLIAM F. STROCK.